United States Patent [19]

Brauer

[11] Patent Number: 4,488,285
[45] Date of Patent: Dec. 11, 1984

[54] STYLUS LIFTER LOCKING MECHANISM FOR VIDEO DISC PLAYER

[75] Inventor: Eric A. Brauer, Danville, Ind.

[73] Assignee: RCA Corporation, New York, N.Y.

[21] Appl. No.: 449,314

[22] Filed: Dec. 13, 1982

[51] Int. Cl.³ .................... G11B 3/02; G11B 17/00
[52] U.S. Cl. .................... 369/170; 369/215; 369/256
[58] Field of Search .......... 369/71, 170, 215, 221, 369/230, 256

[56] References Cited

U.S. PATENT DOCUMENTS 3,952,147 4/1976 Leedom ........................ 369/77.2
4,256,311 3/1981 Allen et al. .................... 369/170
4,358,841 11/1982 Carroll et al. ................. 369/256

FOREIGN PATENT DOCUMENTS 1522845 8/1978 United Kingdom .

Primary Examiner—Steven L. Stephan
Attorney, Agent, or Firm—Paul J. Rasmussen; William H. Meise; William H. Meise

[57] ABSTRACT

The stylus arm carriage is provided with a rotatably-mounted torsional spring element. When the carriage is driven to an off-record home position, a pad mounted in the player above the carriage engages an upstanding portion of the rotatably-mounted element, and turns it around. When turned around, the other end of the rotatably-mounted element engages a carriage-mounted stylus arm support bracket to firmly secure it in place as long as the carriage is at the home position to prevent accidental lowering of the stylus. As the carriage is driven away from its home position, the torsional spring automatically returns to its original position to free the stylus arm.

3 Claims, 7 Drawing Figures

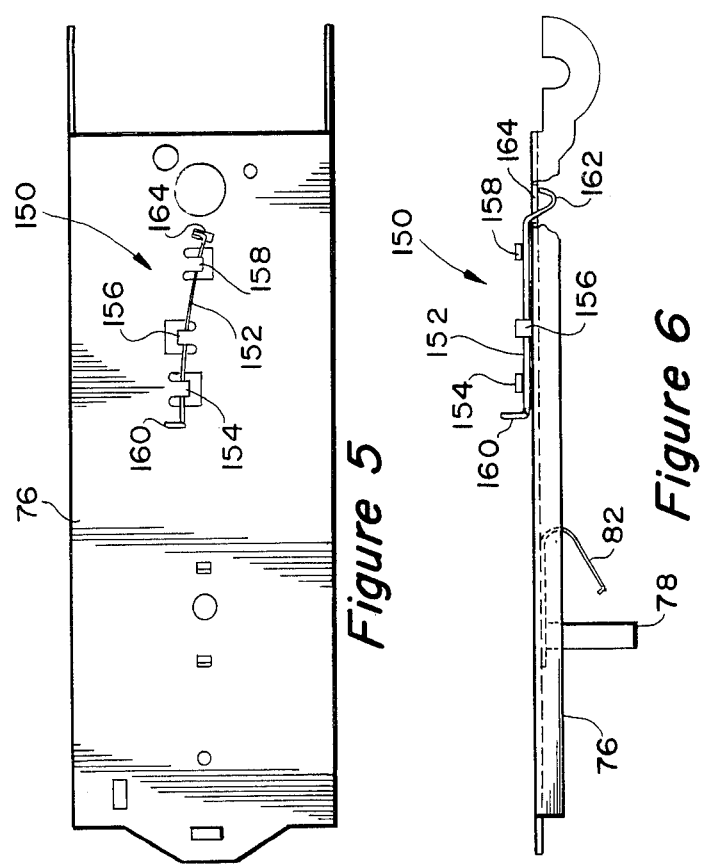

STYLUS LIFTER LOCKING MECHANISM FOR VIDEO DISC PLAYER

The present invention generally relates to a video disc player and, more particularly, it relates to a system for protecting the pickup stylus during handling and shipping.

In a capacitance-type video disc system, audio and video information is recorded as geometric variations in a spiral information track on a disc record having a conductive property. A variable capacitance is formed between a stylus-mounted electrode and the conductive property of the disc record. As the record is rotated, the signal recovered at the stylus electrode is related to the varying capacitance, which, in turn, is directly related to the signal recorded in the information track. The recovered signal is then processed for application to a television receiver for playback of the recorded video and audio information. One example of this type of video disc system is described in U.S. Pat. No. 3,842,194 granted to J. K. Clemens.

In video disc systems, the information track density is generally quite high. For example, the above-mentioned capacitance-type system uses a spirally-grooved information track with a groove density of nearly 10,000 grooves per inch (groove width = approximately 2.5 micrometers). During playback, the stylus tip is received in the groove and guided toward the record center as a turntable-supported record revolves at the desired speed. The microscopic groove geometries require a stylus that has rather fine dimensions (e.g., stylus tip width = 2 micrometers, stylus tip length = 5 micrometers and stylus tip height = 3 micrometers). It is generally the practice with such high density records (both grooved and flat records) to mount the signal recovery stylus in a protective cartridge which, in turn, is installed in a translatable carriage. The bottom wall of the carriage has an elongated aperture through which the stylus is selectively lowered onto a turntable-supported record for playback. The carriage is driven to cause it to follow the radially inward motion of the groove-guided stylus.

Typically, a mechanism is housed in the carriage for selectively lifting and lowering the stylus to effect stylus/record disengagement and engagement respectively. In one stylus lifting/lowering system, a stylus arm support bracket is pivotally mounted in the carriage for motion between a raised position, where the stylus arm is lifted into the carriage, and a lowered position, where the stylus arm is allowed to extend through the bottom wall of the carriage to contact a turntable-mounted record. A selectively-energized electromagnet is provided to cause the stylus arm bracket to swing to the lowered position upon energization. In the absence of signals applied to the lifter electromagnet, the weight distribution of the stylus arm bracket is such that it is held in the raised position.

To protect the delicate stylus, it is desirable to prevent inadvertent lowering of the stylus arm. The handling and shipping activities, for instance, may produce vibrations, which, in turn, can cause the stylus to move around in the carriage, thereby creating the possibility of stylus damage.

The lifter locking mechanism, in accordance with this invention, comprises an element mounted on the carriage for motion between a first position and a second position in response to the disposition of the carriage in above-record playback positions and an off-record standby position respectively. The lifter locking element, when arranged in the second position, firmly secures the lifter bracket in place to reduce the possibility of stylus damage during handling and shipping when the carriage is in the standby mode. In the drawings:

FIG. 1 is a perspective view of a video disc player utilizing a lifter locking mechanism of the present invention;

FIG. 2 gives a perspective view of a stylus cartridge suitable for use with the subject invention;

FIGS. 5-7 illustrate further details of the subject lifter locking mechanism.

Figure 1:
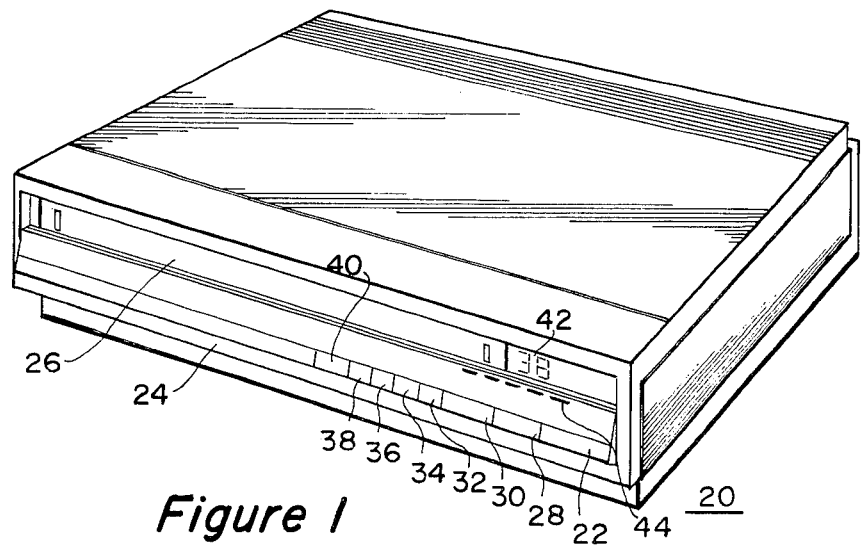

Shown in FIG. 1 is a video disc player 20 incorporating the present lifter locking mechanism. To play a disc, the player is turned on by pressing the POWER button 22 located on the front panel 24. A full record caddy is inserted into the player through a caddy input slot 26, and the empty caddy sleeve is then extracted therefrom leaving the enclosed record/spine assembly inside the player. The record is automatically deposited on the turntable, and played back through a conventional television receiver. At any point during playback, the viewer can reject the remainder of the record by depressing the REJECT button 28, or interrupt the program by activating the PAUSE button 30. In the PAUSE mode, the pickup stylus is raised, and its lateral motion is arrested. When the PAUSE button 30 is operated again, the stylus is lowered and the playback is resumed. A set of pushbuttons 32, 34, 36 and 38 are arranged on the instrument panel 24 to dispose the player in any one of four search modes—i.e., visual search (forward/reverse) and rapid access (forward/reverse)—to enable the viewer to quickly locate a precise section of the prerecorded program. In visual search, the stylus is rapidly moved across the record (16X) while in engagement therewith. In rapid access, the stylus is swept across the record at a much greater speed (120X) while the stylus is down. The player has a CHANNEL A/B button 40 to select any one of two audio channels in the event of a bilingual program disc. An LED indicator 42 shows the elapsed playing time. Various player functions—such as SIDE 1-2, CHANNEL A/B, STEREO—are indicated by a plurality of light indicators 44.

Figure 2:
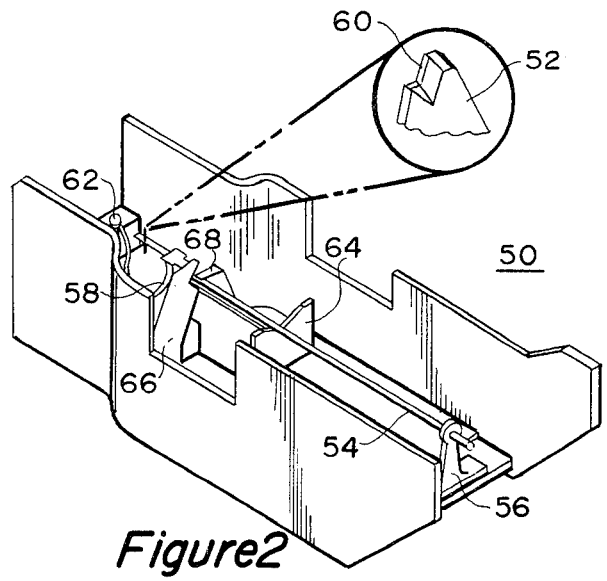

FIG. 2 is a perspective view of a stylus cartridge 50, shown upside-down, comprising a stylus 52 firmly secured at one end of an elongated, tubular stylus arm 54. The other end of the stylus arm 54 is flexibly suspended in the cartridge enclosure by a thin compliant suspension 56. The stylus tip is about 2 micrometers wide, 5 micrometers deep and 3 micrometers high. The stylus arm 54 is in the form of a hollow aluminum tube with the following dimensions: length = 1.654 inches, outside diamter = 0.044 inches and inside diameter = 0.040 inches. A leaf spring or flylead 58, about 0.000560 inches thick, is connected at one end to a thin electrode 60 on the stylus 52. The end of the stylus electrode 60 is about 2 micrometers wide by 0.2 micrometers thick. The other end of the flylead 58 is connected to a terminal 62 disposed on the cartridge body. The flylead 58 provides the stylus/record engagement force, and also serves as the electrical connection between the stylus electrode 60 and the pickup circuitry located within the carriage arm. The stylus arm 54 is held back within the confines of the cartridge housing against a stop 64 by a set of retaining fingers 66 and 68. When the cartridge 50 is installed in the player, the retaining springs 66 and 68 are automatically spread apart to release the stylus arm 54.

Figure 3:
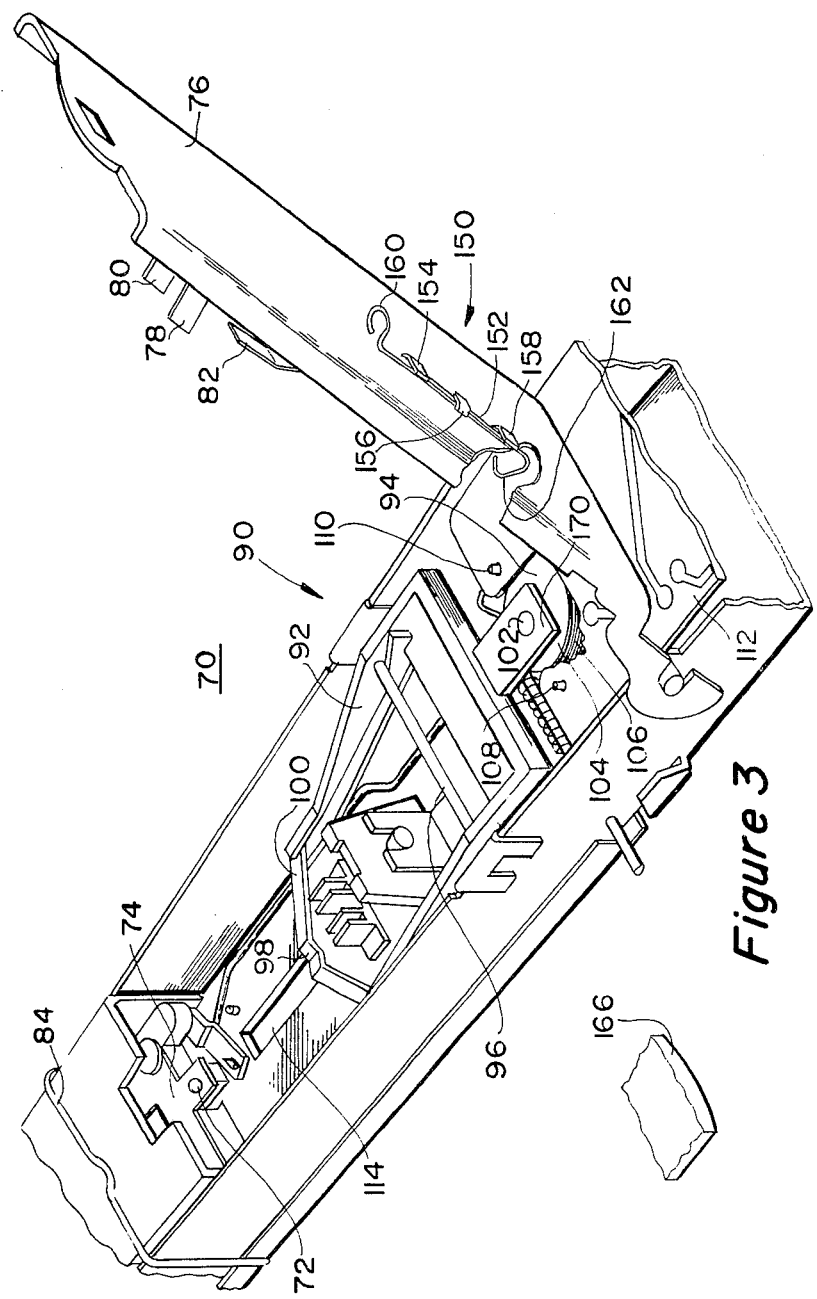
FIG. 3 represents an isometric view of a carriage arm translatably mounted in the FIG. 1 player in which the instant lifter locking mechanism is located.

The stylus cartridge 50 is installed in a carriage 70 shown in FIG. 3. The carriage 70 is translatably mounted in the player in the manner described later. The terminal 62 disposed on the cartridge case engages an input terminal 72 of the pickup electronics 74 housed in the carriage 70 upon reception of the cartridge therein. The carriage lid 76 is fitted with a pair of depending tabs 78 and 80, which engage and spread apart the stylus arm retaining springs 66 and 68 to free the stylus arm 54 when the carriage lid is closed. A leaf spring 82 arranged on the underside of the carriage lid 76 holds the cartridge 50 in place. A wire hoop 84 is provided to lock the carriage lid 76.

The carriage 70 is further equipped with a stylus lifting/lowering device 90 comprising a pivotally-mounted, stylus arm bracket 92 and a selectively-actuated electromagnet 94. The stylus arm bracket 92 is swingably mounted in the carriage 70 about a cross rod 96. When the cartridge 50 is positioned in the carriage 70 and the lid 76 is locked shut, the stylus arm 54 comes to rest in a raised position in a centering depression 98 provided on the cross member 100 of the stylus arm bracket 92. Depending downwardly from the other side of the stylus arm bracket 92, and fixedly secured thereto, is a permanent magnet 102. The permanent magnet 102 has a portion extending into an air gap defined by a non-magnetic core 104 of the electromagnet 94. Disposed about the core 104 is an electrical winding 106 having a pair of terminals 108 and 110 connected to an energization means 112. In the normal condition—i.e., in the absence of signals applied to the electromagnet 94—, the distribution of the weight of the stylus arm bracket 92 is such that the stylus arm 54 is held in the lifted position. When an appropriate signal is applied to the terminals 108 and 110, the bracket-mounted magnet 102 is repelled out of the air gap of the electromagnet to slowly set the stylus 52 down. The energization means 112, when actuated, applies a particular form of signal to the electromagnetic device 94 to assure a gentle stylus set down. The bottom wall of the carriage 70 has an elongated opening 114 to permit the stylus 52 to pass out of the confines of the carriage when the stylus lifting/lowering mechanism 90 is activated.

As will be evident from the brief description of the operation of the video disc player, there are several modes of operation in which the stylus 52 is lowered or lifted. For example, the stylus lifting/lowering device 90 is activated to lower the stylus 52 on a turntable-supported disc for playback, or on a wiping pad 116, illustrated in FIG. 4, for cleaning the stylus tip. The signals are removed from the terminals 108 and 110 of the electromagnet coil 106 to raise the stylus 52 back up into the carriage 70 when the player is set in the PAUSE or OFF modes.

Figure 4:
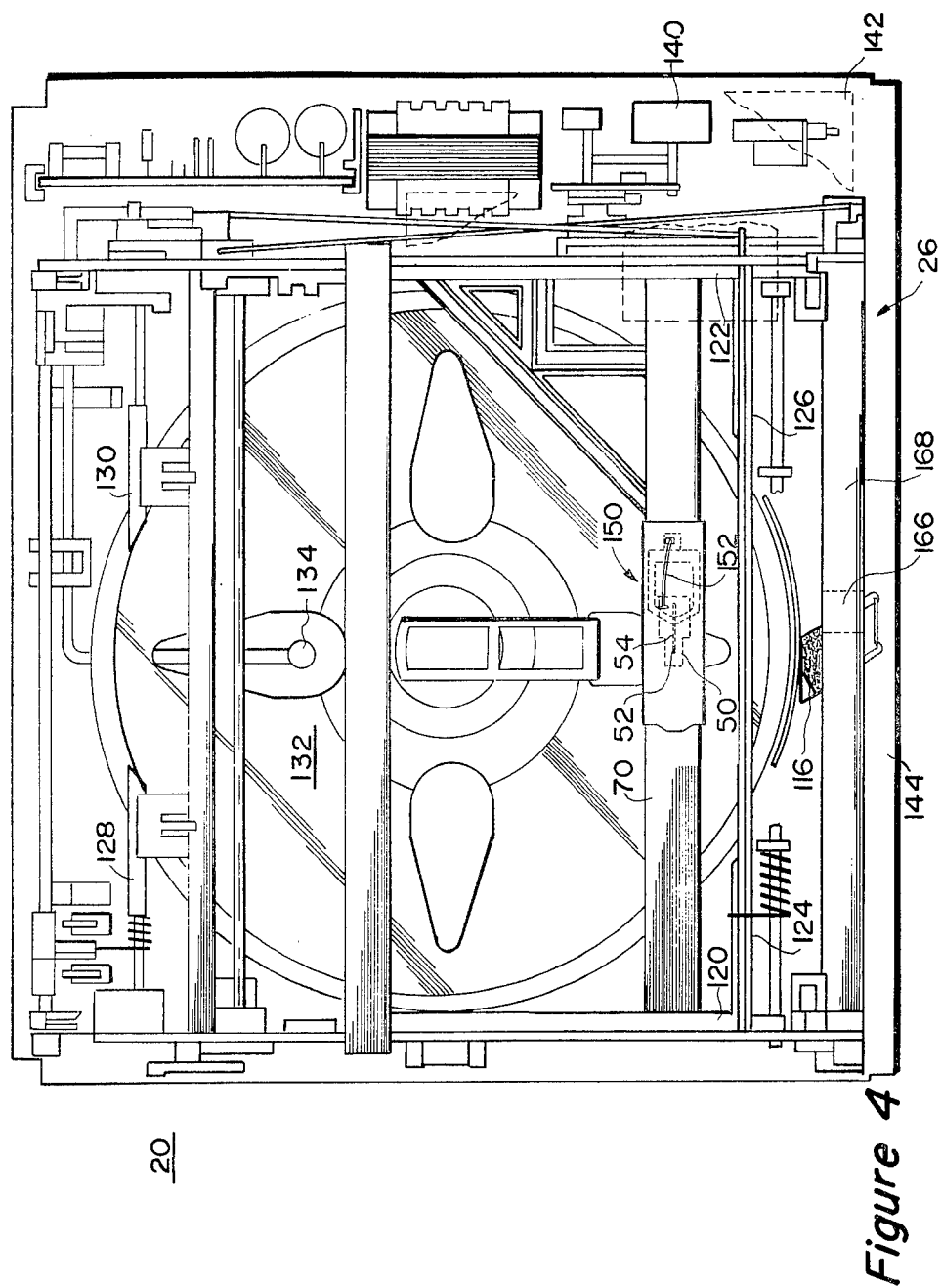
FIG. 4 shows a top view of the video disc player of FIG. 1 with its cover removed to show the underlying details.

Referring to FIG. 4, the pickup carriage 70 is mounted in the player for motion between an off-record rest position and an on-record, end-of-play position along a path defined by a pair of guide rails 120 and 122. A record is loaded into the player by inserting a full caddy into the player. Upon the extraction of the empty sleeve from the player, the enclosed record is left therein resting on a set of receiving pads 124, 126, 128 and 130. The retained record is automatically transferred to a rotatable turntable 132 by a record transfer mechanism including a record handling finger 134. A motor located underneath the turntable 132 drives it to rotate at the desired speed (e.g., 450 rpm). U.S. patent application, Ser. No. 374,377, filed for Hughes, and entitled "Disc Player Having Record Handling Apparatus", now U.S. Pat. No. 4,439,852, describes a suitable record extraction and transfer mechanism.

A stepper motor 140 drives the carriage 70 from the off-record rest position to a starting position over the turntable-supported record, and the stylus arm lifting/lowering device 90 is energized to lower the stylus 52 onto the record. During playback, the carrige 70 is driven toward the record center so as to cause it to track the radically-inward motion of the stylus 52. The signals at the output of the reproducing stylus 52 are processed by the pickup circuits 74 housed in the carriage 70, and fed to signal processing circuitry disposed on a signal board 142 attached to the centerplate 144 of the player. The signal processing circuitry converts the signals at the output of the pickup circuits 74 into a form suitable for application to a conventional television receiver. When the carriage 70 reaches the end-of-play position, the stylus 52 is raised and the carriage is driven back until it operates a microswitch to reset it at its off-record rest position. The record is automatically transferred back to the record receiving pads 124, 126, 128 and 130. The record is then retrieved from the player by inserting an empty sleeve into the player and withdrawing it therefrom.

As previously indicated, it is desirable to prevent accidental lowering of the stylus arm 54. To this end, the video disc player 20 is equipped with a carriage-mounted lifter locking mechanism 150 in accordance with this invention. As can be seen more clearly in FIGS. 5–7, the lifter locking mechanism 150 includes a torsional wire form spring 152 which is rotatably mounted on the carriage lid 76 by wedging it between three tabs 154, 156 and 158 disposed on the lid.

One end 160 of the torsional spring 152 extends above the carriage lid 76 as shown in FIGS. 3 and 6. The other end 162 of the torsional spring 152 is threaded through an opening 164 in the lid 76, and protrudes below the lid into the carriage housing 70. The torsional spring 152 is slightly bowed, as illustrated in FIGS. 5 and 7, which causes it to lay flat against the lid 76, thereby providing the desired bias.

As the carriage 70 is driven to the rest position, a pad 166 disposed on the underside of a player-mounted cross-member 168 engages the upstanding portion 160 of the torsional spring 152, and turns it around in a manner causing the depending portion 162 located at the other end of the torsional spring to ride up and over the rearwardly extending tab 170 of the lifter bracket 92 to firmly secure the lifter bracket in place. The lifter bracket 92 then, in turn, wedges the stylus arm 54 against the stop 64 disposed in the cartridge 50 to restrain the stylus arm from motion as long as the carriage 70 is at the rest position. The ends of the torsional spring 152 are curled as shown in FIG. 7 to provide smooth engagement and disengagement respectively with the player-mounted pad 166 and the lifter bracket tab 170.

When the motor 140 drives the carriage 70 away from the home position, the torsional forces in the wire form 152 cause it to automatically return to its initial position shown in FIG. 6, whereby the lifter bracket 92 is freed. The stylus 52 can then be lowered onto a turntable-mounted record for playback as previously indicated.

The subject stylus arm locking mechanism is relatively simple, inexpensive, and quite effective in protecting the stylus arm assembly during handling and shipping.

What is claimed is:

1. In a record player including a pickup stylus subject to engagement with a turntable-supported record during playback; said stylus being mounted at one end of a stylus arm having its other end yieldably supported in a translatable carriage which is subject to lateral motion toward and away from an off-record rest position; said player further having a selectively-activated means mounted in said carriage for lifting and lowering said stylus arm in a manner causing said stylus to protrude from said carriage to effect engagement and disengagement of said stylus with a turntable-disposed record; said stylus lifting/lowering means including a stylus arm bracket mounted for motion between a raised position and a lowered position; an apparatus comprising:

sensing element mounted to said carriage for motion between a first position and a second position in response to the disposition of said carriage away from said rest position and at said rest position respectively; said element being biased to occupy said first position; one end of said element engaging a portion of said player as said carriage is driven toward said rest position to displace said element to said second position thereof; the other end of said element engaging said stylus arm bracket to hold it in place when said element is deflected to said second position.

2. The claim 1 apparatus wherein said carriage is provided with a lid; said element being rotatably mounted on said lid for motion between a first angular position and a second angular position; said element having an upstanding portion extending away from said lid for engagement with said portion of said player as said carriage is driven toward said rest position; said element having a depending portion projecting into said carriage for engagement with said stylus arm bracket to secure it in place when said element is occupying said second position.

3. The apparatus as defined in claim 2 wherein said element is mounted on said lid such that it is held flat against the exterior surface of said lid; said element being bowed to provide the desired bias toward said first position.

* * * * *